(12) United States Patent
Doll

(10) Patent No.: US 8,602,476 B2
(45) Date of Patent: Dec. 10, 2013

(54) DRAWER AND STORAGE COMPARTMENT DEVICE WITH A DRAWER

(75) Inventor: Volker Doll, Ranschbach (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 13/528,690

(22) Filed: Jun. 20, 2012

(65) Prior Publication Data

US 2013/0154297 A1    Jun. 20, 2013

(30) Foreign Application Priority Data

Jun. 20, 2011    (DE) .................. 10 2011 105 035

(51) Int. Cl.
*B60R 7/06*    (2006.01)

(52) U.S. Cl.
USPC .................................. 296/37.12; 312/330.1

(58) Field of Classification Search
USPC ........... 296/37.12, 37.9; 312/330.1, 331, 402, 312/319.8, 348.4, 321.4, 322, 323, 312/302–303, 321.5
See application file for complete search history.

(56) References Cited

U.S. PATENT DOCUMENTS

| | | | | |
|---|---|---|---|---|
| 302,469 | A * | 7/1884 | Cook | 211/83 |
| 2,116,370 | A * | 5/1938 | Watkins | 109/70 |
| 4,720,131 | A | 1/1988 | Grote | |
| 8,283,610 | B2 * | 10/2012 | Hirano | 219/520 |
| 2004/0140685 | A1 | 7/2004 | Bieck et al. | |
| 2006/0131913 | A1 | 6/2006 | Herterich et al. | |
| 2012/0248958 | A1 * | 10/2012 | Ertz et al. | 312/405 |

FOREIGN PATENT DOCUMENTS

| | | |
|---|---|---|
| DE | 3602197 | 1/1986 |
| DE | 19755621 | 6/1999 |
| DE | 19829363 | 1/2000 |
| DE | 10029088 | 1/2002 |
| DE | 102006046562 | 4/2008 |
| EP | 1431123 | 6/2004 |

* cited by examiner

*Primary Examiner* — Dennis Pedder
(74) *Attorney, Agent, or Firm* — Reising Ethington P.C.

(57) ABSTRACT

A storage compartment device for an interior panel part of a vehicle, having a housing with at least one access opening, through which a drawer is at least partially movable. In addition, a drawer with side walls and a base is present, which is movable between a retracted and an extended position through the access opening of the housing. A drawer cover can be moved between a covering position and an exposing position.

7 Claims, 12 Drawing Sheets

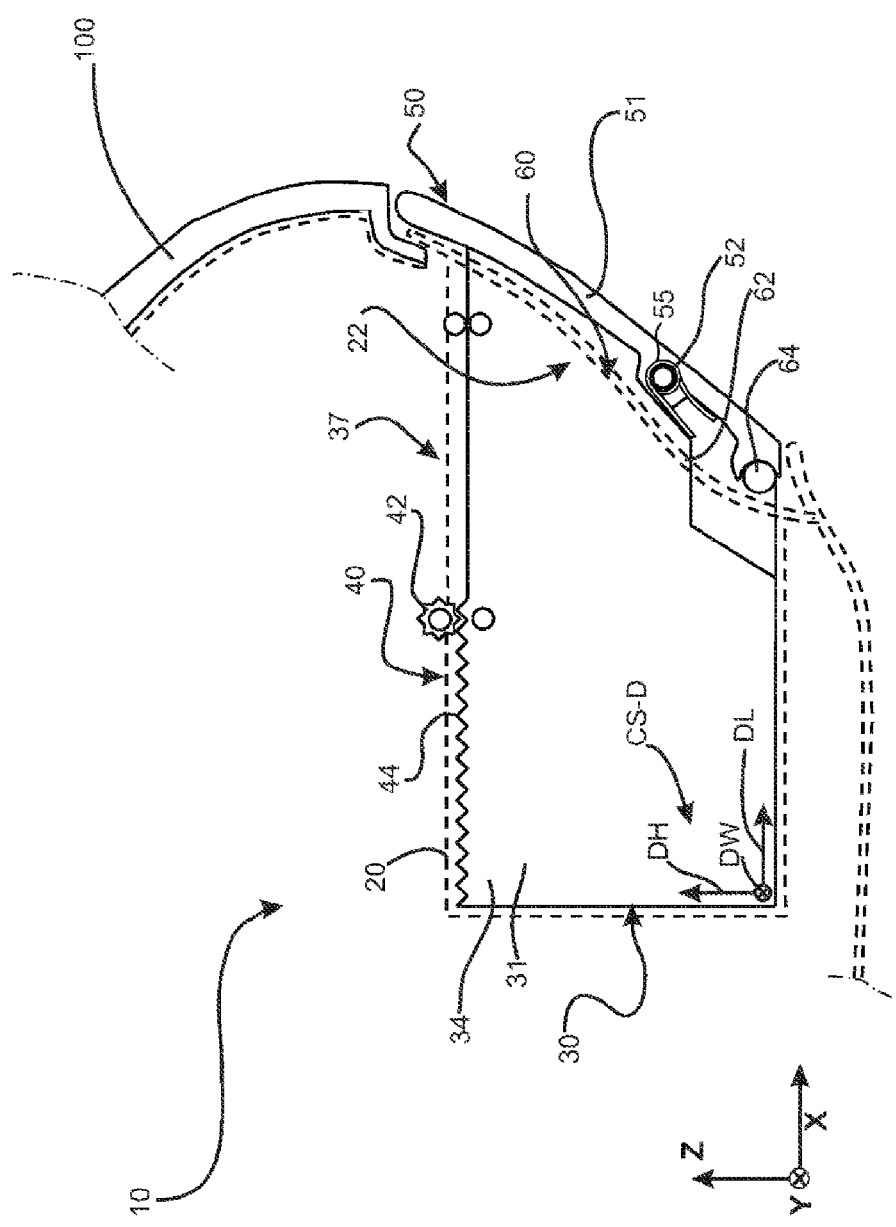

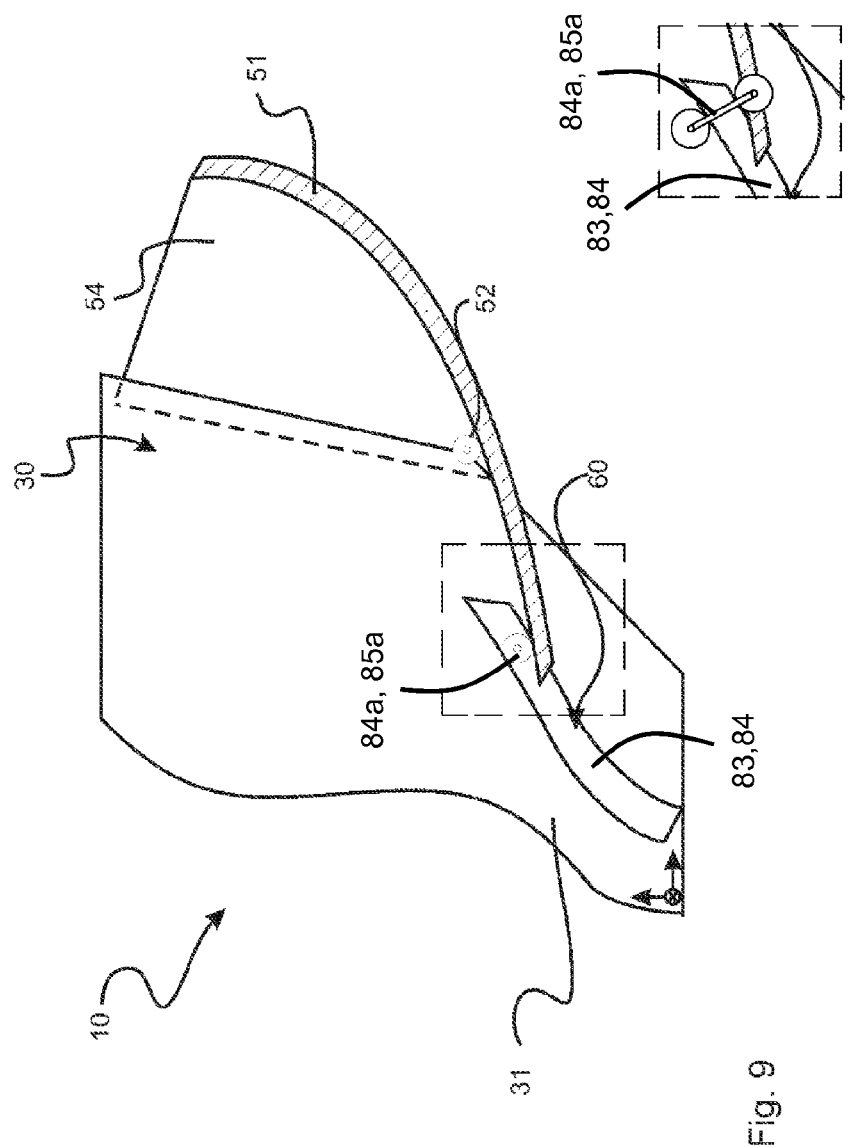

DRAWER AND STORAGE COMPARTMENT DEVICE WITH A DRAWER

TECHNICAL FIELD

The present invention relates to drawers and storage compartments used in the interiors of motor vehicles.

BACKGROUND OF THE INVENTION

From the document US 2006/131913 A1 such a storage compartment, also designated a glove compartment, is known, which can be moved as a drawer along a track from a retracted position into an extended position.

From the document US 2006/131913 A1 and EP 1 431 123 A1 a flap mechanism is known for a storage compartment with a flap, which is movable about a rotation bearing such that an opening for access and/or viewing into the storage compartment device can be opened and closed.

SUMMARY OF THE INVENTION

It is an object of the present invention to provide a drawer and a storage compartment device with such a drawer which is simply structured and producible and provides a user-friendly accessibility and an advantageous storage volume. Another object of the invention is to provide a drawer and a storage compartment that may be used in relatively limited space conditions in the interior of a vehicle.

According to an embodiment of the invention, a drawer is provided which is designed for being inserted in a frame device with an opening facing the interior of a vehicle such that the drawer in its inserted state is movable between a retracted and an extended state in which the drawer partially extends beyond the opening. The drawer comprises with regard to an occupant in the interior of the vehicle and with the inserted state of the drawer a front area, a rear area, a top area and a bottom area. The drawer further comprises:
- a container, which comprises a base, a rear wall and side walls for defining a container internal space,
- a cover device which is disposed at a front area of the container for partially defining a container internal space,
- a pivot bearing device by which the front plate is pivotally linked to the container for being movable between an opened and a closed position,
- a guiding portion of the cover device, which can be brought in contact with a guide track device of the frame device, wherein the cover device and the guiding portion are designed such that the guiding portion is held in contact with the guide track device so that with a movement of the of the drawer in direction to its extended position a movement of the cover device in its opened position is coupled, in order to increase the access area of a passenger to the container internal space, and vice versa.

According to an embodiment of the drawer according to the invention, the cover device comprises side plates, wherein each of which extend from a side edge of the side plates and is aligned with an adjacent side wall of the container such that the side plates overlap the respective side wall of the container.

According to an embodiment of the drawer according to the invention, the cover device is positioned at the container such that with a corresponding shape of the guide track device the cover device tends to move in its open position due to a rotational momentum which is generated by a force due to gravity within the movement of the drawer between the retracted and the extended position so that the guiding portion is pressed against the guide track device.

According to an embodiment of the drawer according to the invention the guiding portion is adapted to engage around a guide track of the guide track device so that the guiding portion is in contact with the guide track within the movement of the drawer between the retracted and the extended position.

According to an embodiment of the drawer according to the invention a guide track of the guide track device in form of a guidance groove is adapted to engage around the guiding portion so that the guiding portion is in contact with the guide track within the movement of the drawer between the retracted and the extended position.

According to an embodiment of the drawer according to the invention the container comprises a connection device for transmission of a driving movement generated by a drive device in order to move the container between its extended and retracted position.

According to an embodiment of the drawer according to the invention the cover device is prestressed by a biasing device by which the cover device is pressed or drawn in its closed position.

According to another aspect of the invention, a storage compartment device is provided, wherein the compartment device comprises a frame device with an opening and a drawer for inserting in the frame device such that the drawer in its inserted state is movable between a retracted and an extended state in which the drawer partially extends beyond the opening, wherein the drawer comprises with regard to a user of the drawer a front area, a rear area, a top area and a bottom area, the drawer comprising:
- a container, which comprises a base, a rear wall and side walls for defining a container internal space,
- a cover device which is disposed at a front area of the container for partially defining a container internal space,
- a pivot bearing device by which the front plate is pivotally linked to the container for being movable between an opened and a closed position,
- a guiding portion of the cover device, which can be brought in contact with a guide track device of the frame device, wherein the cover device and the guiding portion are designed such that the guiding portion is held in contact with the guide track device so that with a movement of the of the drawer in direction to its extended position a movement of the cover device in its opened position is coupled, in order to increase the access area of a passenger to the container internal space, and vice versa.

In an embodiment of the storage compartment device according to the invention the cover device comprises side plates, wherein each of which extend from a side edge of the side plates and is aligned with an adjacent side wall of the container such that the side plates overlap the respective side wall of the container.

In an embodiment of the storage compartment device according to the invention the cover device is positioned at the container such that with a corresponding shape of the guide track device the cover device tends to move in its open position due to a rotational momentum which is generated by a force due to gravity within the movement of the drawer between the retracted and the extended position so that the guiding portion is pressed against the guide track device.

In an embodiment of the storage compartment device according to the invention the guiding portion is adapted to engage around a guide track of the guide track device so that the guiding portion is in contact with the guide track within the movement of the drawer between the retracted and the extended position.

In an embodiment of the storage compartment device according to the invention a guide track of the guide track device in form of a guidance groove is adapted to engage around the guiding portion so that the guiding portion is in contact with the guide track within the movement of the drawer between the retracted and the extended position.

In an embodiment of the storage compartment device according to the invention the drawer coverfront plate is acted upon by a prestressing force, which presses and/or draws the drawer coverfront plate into the covering closed position.

In an embodiment of the storage compartment device according to the invention the container comprises a connection device for transmission of a driving movement generated by a drive device in order to move the container between its extended and retracted position.

In an embodiment of the storage compartment device according to the invention the movement device has a toothed wheel and a toothed rack, which are associated with the drawer and the housing or vice versa.

In at least some embodiments, the storage compartment device may have a housing with at least one access opening. A drawer is able to be moved at least partially through this access opening. The access opening is therefore also to be designated as a movement opening for the drawer in the housing. The drawer is additionally provided with side walls and a base, wherein the side walls and the base define the storage volume of the drawer. Advantageously, the drawer is open at the top, so that an access and/or a view can take place in the extended state from above into the storage volume of the drawer.

The drawer is movable between a retracted and an extended position through the access opening of the housing. The retracted position of the drawer is distinguished in that a view and/an access into the storage volume is essentially not possible in this retracted position. In the extended position, such an intervention into the storage volume of the drawer is possible. A drive device serves for the movement of the drawer between the retracted position and the extended position. At the same time, the drive device can also serve for the mounting of the drawer. Such a drive device can therefore be, in the simplest manner, a track system, wherein the drawer is suspended in such a track, i.e. is mounted, and is movable in a translatory manner in this track. Of course, the drive device can also be configured in a more complex manner, according to necessity, in particular it can have active elements for the movement of the drawer between the retracted and the extended position. Thus, for example, mechanical, electromechanical or other drive mechanisms are conceivable, which in the drive device drive the movement of the drawer between the retracted and the extended position.

For covering the storage volume of the drawer, a cover device is provided. This is mounted pivotably or respectively rotatably by means of a bearing device on the drawer such that it is situated in a covering position in the retracted position of the drawer. In this covering position, it at least partially covers the drawer. In an extended position of the drawer, the cover device is situated in an exposing position, in which it at least partially exposes it. In other words, in addition to the mobility of the drawer, a mobility of the cover device is also provided.

These two mobilities correlate with one another such that by the moving of the drawer into the extended position, the cover device moves into the exposing position and vice versa. For this correlation, a guide device is provided which is coupled with drive device and which serves for the movement of the cover device between the covering position and the exposing position. The guide device can therefore also be understood as a coupling between the movement of the drawer and the movement of the cover device.

Such guide devices can be configured in the most varied of ways. They can be purely mechanical in nature or can also have electromechanical or other drive mechanisms. A preferred embodiment of the guide device is a mechanical construction, as this can be constructed with very few, and particularly simple and favourably priced components, and does not require any additional connections, whereby the complexity of the guide device is reduced.

As used herein, a "housing" is to be understood to mean an element which can serve as a bearing for the drawer. Such a housing does not compulsorily have to be completely closed, but can also form the necessary function for the bearing of the drawer in the form of a partially open frame, in particular with the aid of the drive device. The housing is not necessarily visible here for the occupant of a vehicle who wishes to use such a storage compartment device. In particular, the storage compartment device therefore forms, by the housing, a static part with regard to the mobility of the drawer, which can serve for the connection in the interior of a vehicle, i.e. for the fastening of the storage compartment device in a vehicle, or respectively on an interior panel part of a vehicle.

The terms "exposing position" and "covering position" of the cover device are to be understood as follows. In the covering position, the cover device is situated in a position in which it covers at least a portion of the drawer, so that a view and/or access into the storage volume of the drawer through the covered part is not possible. It is to be pointed out here that the covering does not have to take place completely, but rather that by the retracting of the drawer into the housing into the retracted position, already by the housing itself or by further elements of an interior panel part of a vehicle, a majority of the possibilities for access and viewing into the storage volume of the drawer are covered. The cover device must necessarily only cover the remaining opening, in particular a region which corresponds substantially to the access opening of the housing. Covering here of course means a technically expedient covering and not a complete covering, so that clearances which are necessary for manufacture can remain with the covering.

The exposing position is to be understood as a position of the cover device into which it has carried out a pivoting movement out from the covering position. In the exposing position, the cover device is therefore situated in a position in which it exposes at least a portion of the access to the storage volume of the drawer. The exposure is to be understood here to mean the view and/or access into the storage volume of the drawer.

On drawing the drawer out into the extended position, thereby the view and/or access into the storage volume of the drawer of the storage compartment device is enabled in two ways. Firstly, by the drawing out of the drawer, the covering of a majority of the storage volume by further interior panel parts and/or by the housing of the storage compartment device is overridden, so that a view and an access become possible. Moreover, the cover device moves into its exposing position, so that also the region of the drawer which was previously covered by the cover device, is now at least partially exposed. In other words, the possibility of viewing and access into the storage volume of the drawer is added to a sum of the exposure by the exposing position of the cover device and the exposure by the moving of the drawer into the extended position. In this way, an improved possibility for access and viewing into the drawer of the storage compartment device is provided. With the same withdrawal, compared with a simple drawer, by folding down (moving) the cover device into the exposing position, an increased possibility for intervention and viewing can be provided.

It can be advantageous if the guide device guides the cover device, on moving the drawer into the retracted position, in its covering position. The guide device therefore has a part of the correlation, so that a movement coupling exists between the movement of the drawer and the movement of the cover device. Depending on the embodiment of the guide device, this can be solved in different ways. The cover device is therefore guided actively by the guide device into the covering position, and this guidance takes place as a function of the movement of the drawer into the retracted position. The handling of a storage compartment device is implied by the guide device. A user, i.e. the occupant of a vehicle, only has to move the storage compartment device, in particular the drawer, into the retracted position. The cover device follows, guided by the guide device, automatically and moves into the covering position, so that by the movement of the drawer into the retracted position, the storage compartment device can be completely closed.

It can likewise be advantageous if, the guide device guides the cover device, on moving of the drawer into the extended position, in its exposing position. This concerns, as it were, the reverse direction of movement with regard to the coupling, as has been explained in the preceding paragraph. Here, also, the cover device is actively guided and the occupant of a vehicle, owing to the automatic coupling through the guide device between cover device and drawer itself, only has to initiate or carry out the movement of the drawer. This also further improves and simplifies the handling of the storage compartment device.

It is likewise advantageous if the guide device has at least one guide track. On and/or in this guide track at least one guide portion is guided, which is associated with the cover device, e.g. is arranged on the cover device. The guide itself can be configured here in various ways and is adapted in particular to the type of guide portion. The guide track here is in particular stationary with respect to the housing of the storage compartment device, whilst the guide portion is stationary with respect to the cover device. A relative movement between the cover device and the housing therefore results in a relative movement between the guide portion and the guide track. In other words, by the movement of the drawer, or respectively therefore also the movement of the cover device, a relative movement is produced between guide portion and guide track.

This relative movement can be utilized in order to initiate the desired movement of the cover device between the covering position and the exposing position through the direction setting of the guide track or respectively the configuration of the guide portion. The guide track can be both a one-sided stop here, on which the guide portion can move along the guide track. It is also conceivable that the guide track concerns a complete guidance of the guide portion, so that the guide portion is totally restricted with regard to its freedom of movement by the guide track to the desired line of movement.

The guide track itself is advantageously limited here to the necessary range of the guidance, in order to guarantee the movement of the cover device between the covering position and the exposing position. At the two end points of the guide track, at which the guide portion is situated, when the cover device is in the exposing position, or respectively in the covering position, advantageously a stop is provided, so that a further movement of the guide portion is not possible. Thereby also the end positions of the guide portion and hence the end positions of the cover device, i.e. the exposing position and the covering position, are exactly defined.

It is likewise advantageous if the guide portion is constructed as a rotatable roller. Basically, a rotatably mounted guide portion is advantageous, because in this way the friction between guide portion and guide track is reduced to a minimum. Thereby, the necessary expenditure of force, the wear resulting through the expenditure of force, and the noise emission occurring through the movement of the guide portion along the guide track is reduced to the desired extent, whereby quality perception of the storage compartment device is improved.

It is a further advantage if the guide track has a continuous curvature course. "Continuous curvature course" is to be understood to mean that the curvature can basically vary, but no jumps in the curvature, in particular no gradations are present. In this way, through the continuous, in particular the constantly varying curvature course of the guide track, a correspondingly smooth movement course of the cover device between the covering position and the exposing position can be guaranteed. A smooth movement course is to be understood to mean here a substantially jerk-free movement of the cover device, in particular a jump-free movement. A smooth movement guidance by the guide device is advantageous, because occupants of a vehicle equate such a movement with high quality of the storage compartment device itself.

It is likewise advantageous if the guide device has a support of the cover device against the drawer. This support prevents a pivoting movement of the cover device about other axes than a pivot axis defined by the bearing device. In order to achieve this, it can be advantageous if the guide device has for example more than one, in particular two guide tracks, which are provided at positions of the housing which permit a supporting according to the invention. Frequently in the configuration of the storage compartment device, the use of two guide tracks will be advantageous, which in relation to the access opening of the housing are arranged to the left and right of the latter, so that the drawer can move through the access opening between the guide tracks. Thereby, as wide a supporting as possible occurs for the cover device against the guide tracks and hence against the housing, so that the lever arm for the supporting and hence the possible force transmissions are maximized. Through the supporting of the cover, the quality of the guidance and hence the quality of the movement course of the cover device between the exposing position and the covering position is still further improved.

It can be advantageous if the bearing device, in relation to the installation position of the storage compartment device in a vehicle, is arranged in the lower third of the cover device. In this way, a lever ratio is achieved, in which the majority, in particular more than two thirds of the cover device, is the relevant section of the cover device which is responsible for the covering, or respectively the exposure to the storage volume of the drawer. The maximizing of this section by the arranging, according to the invention, of the bearing device has the advantage that with the same dimensioning of the cover device, the additional exposure length, or respectively the additional exposure area, can be increased. As the possibility of the entire access into the storage volume of the drawer is composed as a sum of the exposed section in the exposure position of the cover device and the exposed section by the extending of the drawer into the extended position, the entire access possibility can be improved by the arranging of the bearing device in the lower third of the cover device.

It is likewise advantageous if the cover device has side wall elements. These are aligned along the adjoining side wall of the drawer and preferably at least partially overlapping therewith in the covering position. By this overlapping, a further advantage can be achieved during the extending into the extended position and the moving, occurring simultaneously therewith, of the cover device into the exposing position. The overlapping decreases by the moving of the cover device into the exposing position, so that the side wall elements of the cover device as it were are extended and further cover the gap otherwise occurring between the cover device and the respective side wall of the drawer. Advantageously, the overlapping between the side walls of the drawer and the side wall elements of the cover device is so great that it is sufficient to almost completely cover the gap occurring in the exposing position of the cover device between the latter and the side walls of the drawer. In this way, the advantage can be achieved that on the one hand the gap having a visually disadvantageous effect is covered, and moreover a falling out of objects, or respectively a jamming in this gap, which would make difficult or prevent a moving of the cover device back into the covering position, is avoided.

In addition it is advantageous if the side wall elements are formed at least partially from an elastic material. In such an embodiment, the side wall elements of the cover device can be connected with the side walls of the drawer, so that during the movement of the cover device into the exposing position, the elastic material is expanded, and on moving of the cover device back into the covering position, the elastic material forms back again. Through the elastic configuration and the thus possible fastening of the side wall elements of the cover device on the side walls of the drawer, an overlapping of the side wall elements and of the side walls becomes no longer necessary, and nevertheless the resulting gap is almost completely prevented.

In addition it is advantageous if the bearing device of the cover device is arranged such that its rotation axis is spaced apart from the centre of gravity of the cover device in one direction, so that the weight force of the cover device generates a torque about this pivot- or respectively rotation axis, which works towards the movement of the cover device into the exposing position. In other words, the centre of gravity of the cover device is situated in relation to the pivot axis of the cover device such that it would move the cover device into the exposing position without application of force by other means. Therefore advantageously the guide device is arranged relative to the cover device such that it supports the torque which is generated by the weight force of the cover device, and holds the cover device in its covering position, in particular when the drawer is situated in the retracted position.

Through the embodiment described above, the advantage is achieved that no active drive device has to intervene into the movement of the cover device. Rather, the guide device is also able to be constructed purely passively, because the necessary force for opening the cover device can be provided by its own weight force. In this way, the overall system of the storage compartment device can be reduced as regards its complexity. The guide track is able to be configured more simply here, because it only has to provide the supporting and the returning of the cover device into the covering position, i.e. the overcoming of the weight force of the cover device. Of course, the guide device can also be constructed distinctly more simply here, in particular in the form of a simple stop, which on moving of the drawer into the retracted position presses the cover device into the covering position. More elegant, however, with regard to the movement course of the cover device is the use of a guide track, in particular in correlation with a guide portion, which is arranged on the cover device.

It is a further advantage if the guide device presses and/or draws the cover device into the covering position. In other words, a force is applied through the guide device onto the cover device, which presses it into the covering position. One can therefore speak in terms of a prestressing of the cover device, which presses and/or draws the cover device into the covering position. This has the advantage that the cover device, at the corresponding housing regions and/or the regions of an interior panel part, in which it lies in the covering position, is pressed against these corresponding elements. Through the prestressing force, therefore, the stability of the covering position is further improved and in particular an unpleasant rattling through a relative movement of the cover device to these elements is prevented. Moreover, through the prestressing force, the complexity of the storage compartment device can be further simplified, because a locking device of the storage compartment device can be dispensed with. Whereas known glove compartments require locks, which prevent a flapping out of the cover device, through the provision of the prestressing force in connection with the guide device, such a necessity of a locking device can be avoided.

It is also advantageous if the drive device has a combination of at least one toothed wheel and at least one toothed rack, which are arranged on the drawer and on the housing, or vice versa. The toothed wheel and the toothed rack mesh into one another, so that through this form of the gearing a drive of the storage compartment device, in particular a drive of the movement of the drawer between the retracted position and the extended position is possible. The drive of the toothed wheel can take place here electromotively, for example.

It is also advantageous if the drive device has at least one grip element, which is associated with the drawer, e.g. is arranged on the drawer and is able to be used without impairment to the movement of the cover device between the covering position and the exposing position for the moving of the drawer. The grip element serves for operating the drawer of the storage compartment device, for example by an occupant. By the separate construction of the grip element on the drawer, the movement of the cover device is not impaired, so that by the activated movement of the drawer automatically also the movement of the cover device is induced. For example, a recess can be provided in the cover device, through which the occupant of a vehicle can reach the grip element, for example a recessed grip on the drawer.

BRIEF DESCRIPTION OF THE DRAWINGS

The present invention is explained in further detail with the aid of the enclosed figures of the drawings. The terms "left", "right", "above", and "below" which are used here refer to an alignment of the figures of the drawings with normally readable reference numbers. There are shown:

FIG. 9a shows an alternative guiding arrangement.

DESCRIPTION OF THE ILLUSTRATED EMBODIMENTS

An embodiment of a storage compartment device 10 according to the invention is explained with regard to its mode of operation with the aid of FIGS. 1 to 5.

Figure 1B:
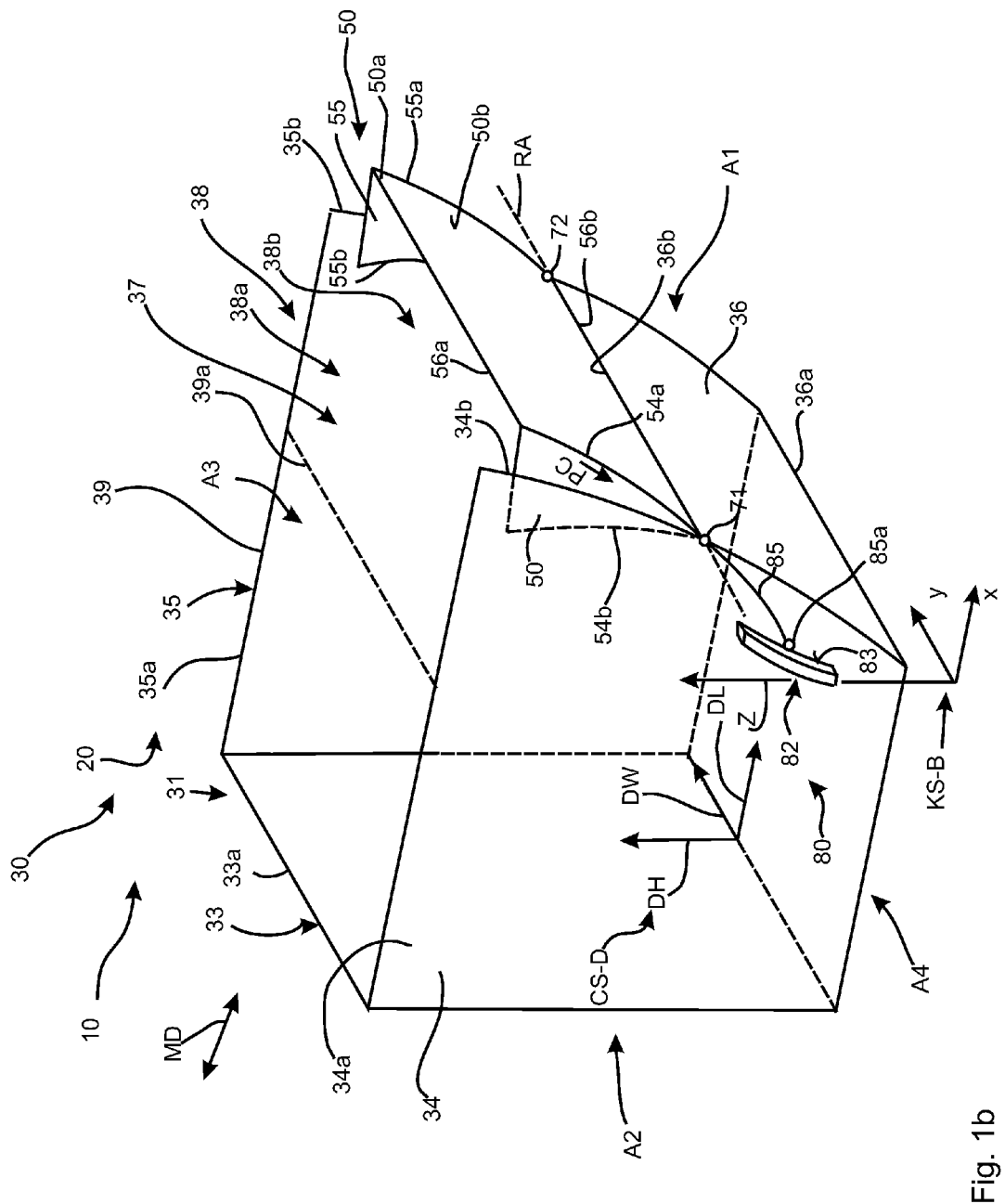
FIG. 1a—a first embodiment of a storage compartment device with a frame device in broken lines and a drawer with a cover device according to the invention with the drawer in retracted position, FIG. 1b—a further embodiment in a schematic view showing a guide track device of the frame device and the drawer with the cover device in an intermediate position, FIG. 1c—a further embodiment in a schematic view showing a guide track device of the frame device and the drawer with the cover device in an intermediate position, wherein the position of a pivotal axis of the cover device differs from the position of a pivotal axis of the cover device in the embodiment of FIG. 1b, FIG. 1d—a front view of an embodiment of the cover device, FIG. 2—the embodiment of FIG. 1 during the movement of the drawer into the extended position, FIG. 3—the embodiment of FIGS. 1 and 2 moved further in the direction of the extended position, FIG. 4—the embodiment of FIGS. 1 to 3, moved further in the direction of the extended position, FIG. 5—the embodiment of FIGS. 1 to 4, with the drawer in extended position, FIG. 6—a further embodiment of a storage compartment device according to the invention, FIG. 7—a further embodiment of a storage compartment device according to the invention, with the drawer in retracted position, FIG. 8—the embodiment of FIG. 7 during the extending of the drawer, and FIG. 9—the embodiment of FIGS. 7 and 8 with the drawer in extended position.
Figure 1C:
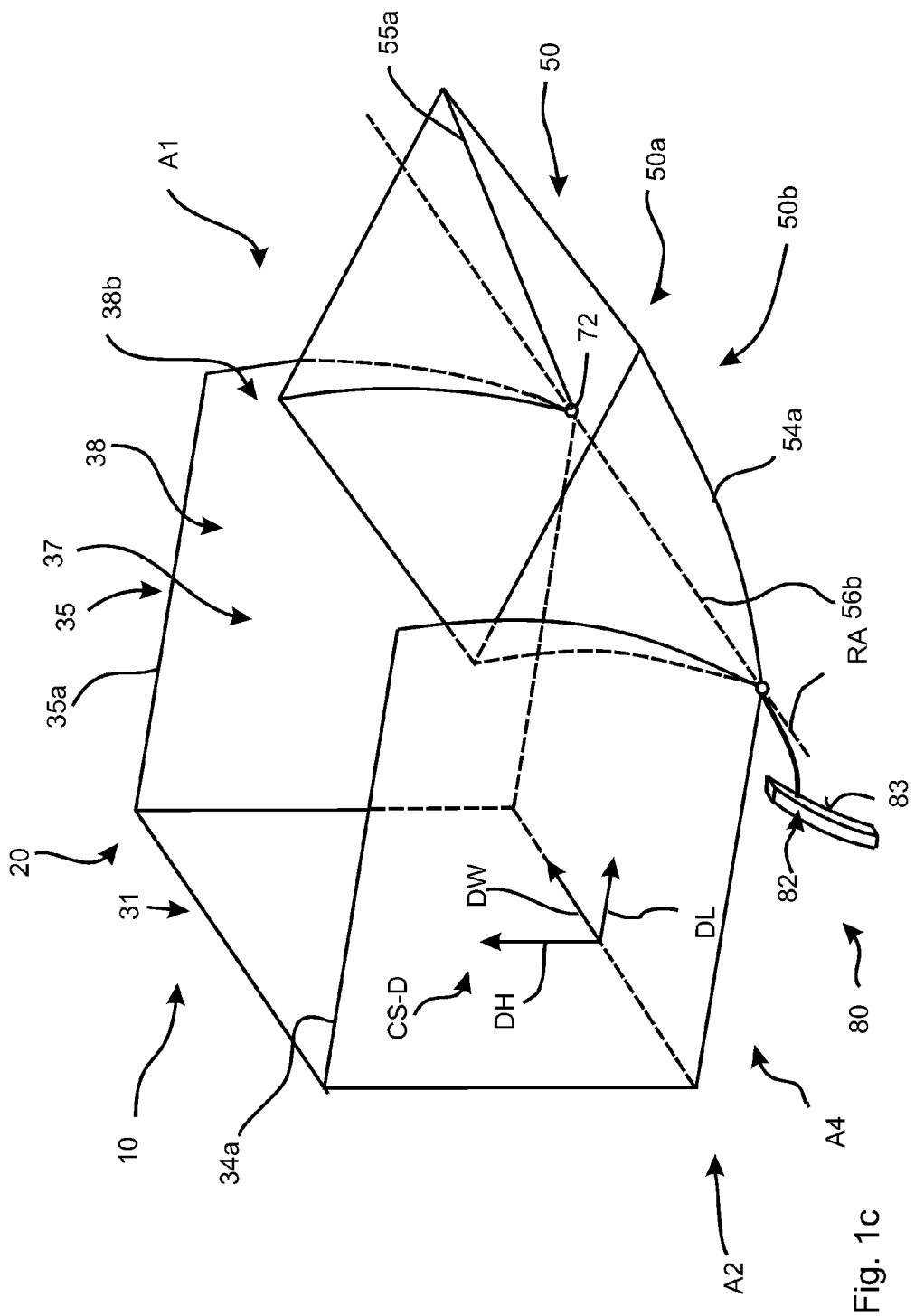
Figure 1D:
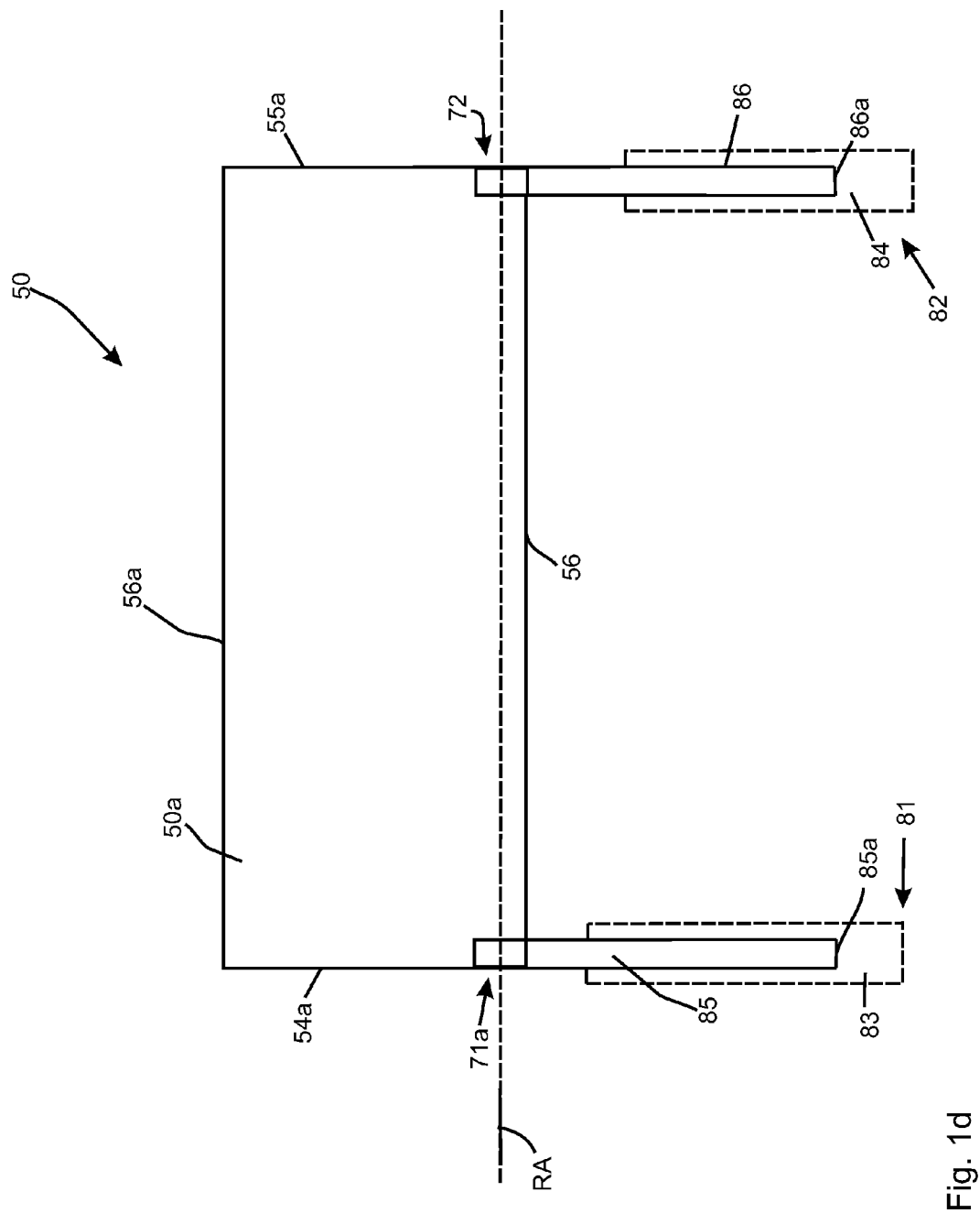

In FIG. 1 the embodiment of this storage compartment device 10 according to the invention is illustrated diagrammatically in cross-sectional representation. The storage compartment device 10 comprises generally a frame 20 which can be at least sectionally in the form of a housing with continuous walls or at least sectionally in the form of a skeleton framing. The storage compartment device 10 is provided to be integrated in the interior of a vehicle. In this regard, the storage compartment device 10 can be designed for being installed in an interior body part B like a support carrier, e.g. a front support carrier on which an instrumental panel is mounted or side door support carrier on which a door trim panel is mounted. Generally, in such an interior body part B an interior trim panel part 100 can be disposed. However, the interior body part B is not necessarily covered by a interior trim panel part 100. The interior panel part 100 which is shown in FIGS. 1 to 5 forms as an example the interior panel of a vehicle in the region in front of the passenger and especially the lining of an instrument panel. Behind the panel of the interior panel part the frame or housing 20 is arranged, which is illustrated in a dashed line in FIG. 1. The drawer 30 is held in this frame 20, which in this regard functions as a housing. In FIGS. 1b and 1c, as an example, a coordinate system CS-B with regard to the interior body part B is added which is defined by a longitudinal direction X of the interior body part B, by a width direction Y of the interior body part B and by a height direction Z of the interior body part B. The coordinate system CS-B can also be the coordinate system of the vehicle which in this case is preferably oriented in a usual manner with the longitudinal direction X being the longitudinal direction of the vehicle.

Figure 5:
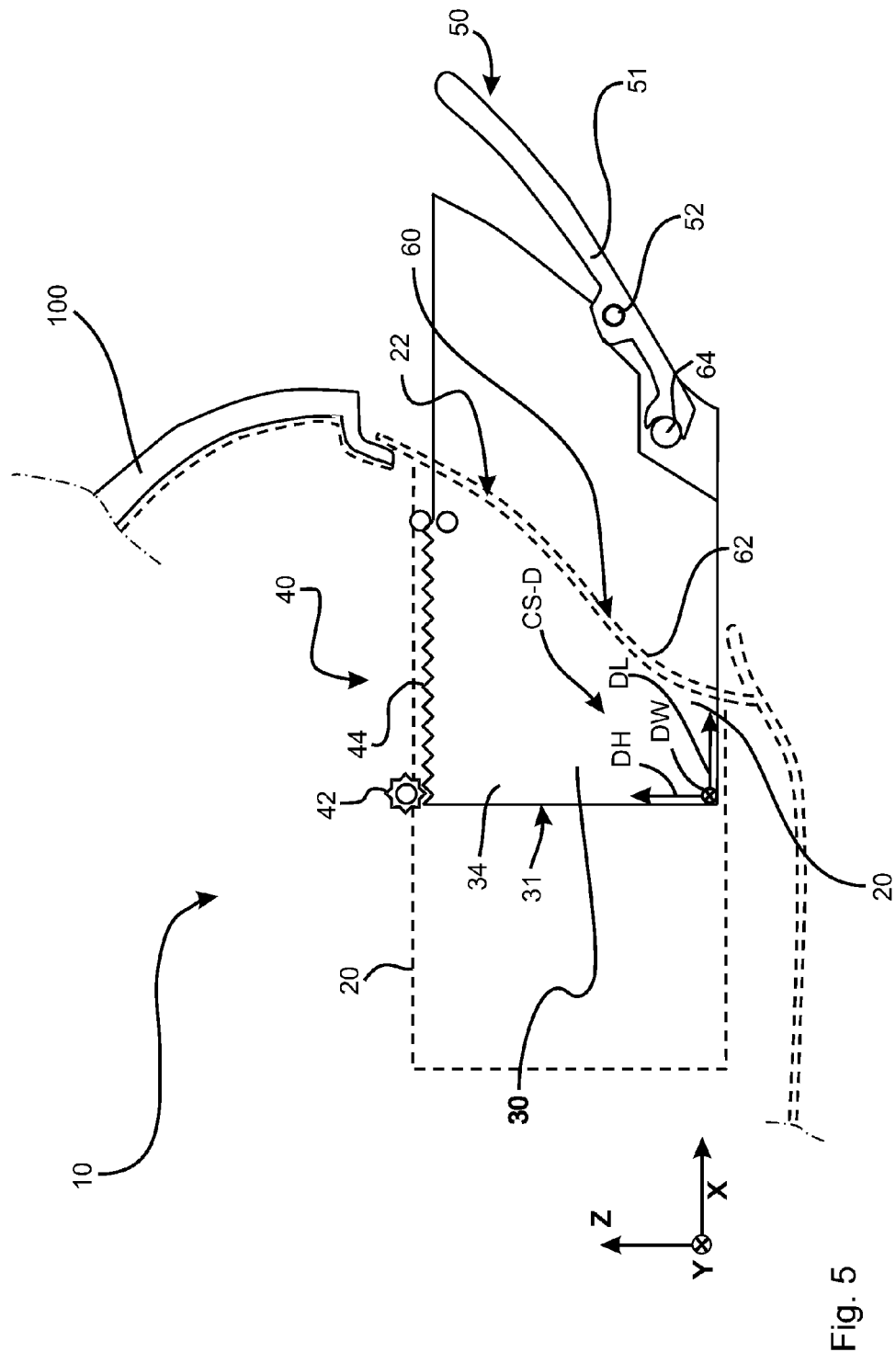

The storage compartment device 10 further comprises a drawer 30 with a container 31, a moveable cover device 50 or cover and a pivot bearing device 70 by which the cover device 50 is pivotally articulated to a front area A1 of the container 31 so that the cover device 50 can be pivoted in different pivotal positions or attitudes in relation to the container 31. The cover device comprises a front plate 50a or cover plate. The cover device 50 can be moved between a closed and an open position and can take intermediate positions there between. In FIGS. 1b and 1c a coordinate system CS-D with regard to the drawer 30 is added which is defined by a longitudinal direction DL of the drawer 30, by a height direction DH of the drawer 30, and by a width direction DW of the drawer 30. The longitudinal direction DL of the drawer 30, can be identical with an axis of symmetry of the container 31. The container 31 can be translationally and/or rotationally moved with regard to the frame 20 between a retracted position (FIG. 1) and an extended position (FIG. 5). With the coordinate systems shown in FIGS. 1b and 1c, the drawer 30 can be moved in the longitudinal direction X of the interior body part B. In FIGS. 1b and 1c, an arrow MD is added showing the movement of the drawer 30 relative to the interior body part B. In particular, the storage compartment device 10 can be realized such, that the container 31 is guided in the frame 20 by a guiding device disposed in the frame 20. The guiding device can be a bottom of the frame 20 on which the container 31 is beared or a rail device which is in engagement with a corresponding rail device of the container. The bottom or the rail devices can be curved in the longitudinal direction DL of the drawer 30 and the longitudinal direction X of the interior body part B, respectively, so that the container 31, when being moved along this direction, performs a movement which is composed by a translational and a rotational component of movement.

The container 31 has the purpose to provide a container internal space 37 to a passenger of the vehicle for storing objects like article of daily use. In particular, the container 31 can be a glove box. The container 31 comprises with regard to an occupant in the interior of the vehicle when looking to the drawer and the container, respectively, installed in the frame 20: a front area A1, a rear area A2, a top area A3 and a bottom area A4. In this regard, the container 31 comprises a base 32, a rear wall 33 and two side walls 34, 35, the inner surfaces of which together with the inner surface of the cover device 50 depending on its actual pivotal position or attitude define the volume of the internal space 37.

The container 31 comprises an access opening 38 by which a passenger or user of the drawer 20 can put objects in the container internal space 37 or take objects therefrom. The access opening 38 is partly formed by an upper opening 38a in the top area A3 between the upper edge 33a of the rear wall 33 and the upper edges 34a, 35a of the side walls 34 and 35, respectively, and partly formed by a front opening 38b in the front area A1 between front edges 34b, 35b of the side walls 34. The container 31 can comprise a top wall 39 with a front edge 39a so that the opening 38a extends between the front edge 39a and the upper edges 34a, 35a of the side walls 34 and 35, respectively. In this case, preferably the front edge 39a is positioned in the longitudinal direction DL such that the upper opening 38a covers 10% to 70% of the top area A3.

The cover device 50 of the drawer 30 is realized such that is extends over the front opening 38b, at most when being in its closed pivotal position in relation to the container 31. The access opening 38 extends between an upper edge 56a of the front plate 50a and the front edge 39a or the upper edge 33 in the embodiment without a top wall 39. Therefore the access to the inner space 37 can be adjusted by changing the pivotal state of the front plate.

The opening state of the cover device 50 is coupled with the moving state or extension state of the container 31 by an adjusting device 80 such that when the container 31 is in its retracted position the cover device 50 is in its closed pivotal position and when the container 31 is in its extended position the cover device 50 is in its open pivotal position. In FIG. 1 the drawer 30 is situated in the retracted position and the cover device 50 is in its closed pivotal position. This means that the storage space of the drawer 30, which is delimited by the side walls 34, 35 and the base 32, is neither visible nor accessible for the occupant of a vehicle when the cover device 50 is integrated with the interior trim panel part 100 as shown in FIGS. 1 to 5. The container internal space 37, i.e. the storage volume of the drawer 30, is arranged here substantially entirely in the interior of the housing 20, so that the covering takes place basically by the interior panel part 100 and the housing 20 and a cover device of the drawer or a drawer cover 50.

In one embodiment the cover device 50 consists of the front plate 50a. In another embodiment of the invention the cover device 50 comprises the front plate 50a and two side panels or side plates 54 and 55, respectively, which extend from each outer edge 55a and 55b, respectively, of the front plate 50a. The edge portions at the outer edges 55a and 55b of the front plate 50a or the transition from an outer surface 50b of the front plate 50a to the side plates 54 and 55, respectively, can be formed in a curved manner in the lateral or width direction DW. The side plates 54 and 55 extend at least partially along edge portions at the front edges 34b, 35b of the side walls 34 and 35, respectively. In this embodiment, the cover device 50 preferably is formed such that the side plates 54 and 55 each overlap the edge portions at the front edges 34b, 35b of the side walls 34 and 35, respectively, in all states of the cover device 50, i.e. in particular in the closed and the open pivotal position of the cover device 50.

The container 31 can comprise a front wall 36 which extends with its lower edge 36a from the base 32 and the front edges 34b, 35b of the side walls 34 and 35 so that it connects the side walls 34 and 35. The front plate 50a lies close to an upper edge 36b of the front wall 36. In this embodiment, the pivot bearing device 70 is realized such that the upper edge 36b of the front wall 36 and the front plate 50a, in particular the lower edge 56b thereof, are lying close to each other (FIG. 1b). In an embodiment without front wall 36, pivot bearing device 70 lies at the lower edge 36a and the front plate 50a, in particular the lower edge 56b thereof (FIG. 1c). A chord direction PC of the front plate 50a running from the upper edge 56a to the lower edge 56b is shown in FIG. 1b.

The pivot bearing device 70 is realized such that it defines a pivot axis RA for pivoting the cover device 50 with regard to the container 31. In the embodiments shown in the figures, the pivot bearing device 70 is realized with articulations 71, 72, each having a first part and a second part coacting with the first part for providing the articulation function. In the embodiment of FIG. 1b the articulations 71, 72 are disposed at the front edges 34b and 35b, respectively. In the embodiments shown in FIGS. 1b, 1c, the front plate 50a is positioned such that the lower edge 56b lies adjacent the upper edge 36b of the front wall. Alternatively, the front plate 50a is positioned such that a lower section of the front plate 50a overlaps an upper portion of the front wall 36. In these embodiments, only one articulation can be provided, for example only on one side of the drawer 20, namely on the side 34 or the side 35, or, in another example, in a middle section of the front plate 50a lying between the outer edges 54a and 55a.

In another embodiment, the pivot bearing device 70 can provide a pivotal movement of the cover device 50 combined with a translational movement of the same. In this embodiment the pivot bearing device 70 can be realized as a guide track being formed at least on one side wall 34, 35 such that the respective guide track engages a guide pin extending from the edges 54a, 55a of the front plate 50a. So that the movement of front plate 50a allows movement between a closed position (FIG. 1) and an open position (FIG. 5) during which the front plate 50a is continuously pivoted in an open position while lower edge 36b of the front plate 50a approaches the base 32. The cover device 50 is connected articulately with the drawer 30 via a bearing device 70 and covers front opening of the drawer 30 with respect to the access opening 22 of the housing 20. Advantageously, the cover device 50 is designed as a movable part of an inner lining part or interior trim panel part 100. Thereby, a substantially closed contour is produced from the visible side of the interior panel part 100, which contour shows the storage compartment device 10 exclusively via gaps between the interior panel part 100 and the cover device 50.

The drawer 30 comprises an adjustment device 80 for adjusting the pivotal position or attitude of the cover device 50 relative to the container 31 in dependence of the position of the container relative to the frame 20. The adjustment device 80 comprises at least one adjustment lever rigidly extending from the front plate 50a. In the embodiments shown in the FIGS. 1b, 1c and 1d, one adjustment lever 85, 86 is provided at each lateral side of the front plate 50a. In particular, at both lateral edges 54a, 55a, one adjustment lever 84 and 85, respectively, can extend. An adjustment lever can also extend from at least one edge 54b, 55b of one of the side plates 54 and 55, respectively. Further the adjustment device 80 comprises at least guide track device 81, 82 which is fixed to the frame 20 or part of the same. Preferably, for each adjustment lever 84, 85 one guide track device 81 and 82, respectively, is provided. In the FIG. 1d both guide track devices 81 and 82 are shown in a schematic manner. Each guide track device 81, 82 comprises a guide track 83 and 84, respectively, with a guiding surface 83a and 84a, respectively. The guiding surface of the guide track 83, 84 can in particular have a curved course when the guiding surface is viewed in the direction of the pivotal axis RA. The storage compartment device 10 is realized such that a guiding portion 85a, 86a or a contacting device or a guide means of the respective adjustment lever 85 and 86, respectively, is contacting the guiding surface when the container 31 is moved between its retracted and extended position and thereby pivots the front plate 50a between its closed and open position. In particular, the guiding portion 85a, 86a can be an end portion (FIGS. 1a, 1b, 1c, 1d, 2 to 5) or an extension of the respective adjustment lever 85 and 86, respectively. The guiding portion 85a, 86a can be realised as a roller rotably disposed at one end of a main arm of the adjustment lever 85, 86.

According to one embodiment, the cover device 50 is positioned at the container 31 such that with a corresponding shape of the guide track device 81, 82 the cover device 50 tends to move in its open position due to a rotational momentum which is generated by a force due to gravity within the movement of the drawer 30 between the retracted and the extended position so that the guiding portion 84a, 85a is pressed against the guide track device 81, 82 (e.g. FIGS. 1a, 1b, 1c, 1d, 2 to 5).

According to another embodiment, the guiding portion 84a, 85a is adapted to engage around a guide track 83, 84 of the guide track device 81, 82 so that the guiding portion 84a, 85a is in contact with the guide track 83, 84 within the movement of the drawer 30 between the retracted and the extended position (FIG. 9a). Alternatively, a guide track 83, 84 of the guide track device 81, 82 in form of a guidance groove can be adapted to engage around the guiding portion 84a, 85a so that the guiding portion 84a, 85a is in contact with the guide track 83, 84 within the movement of the drawer 30 between the retracted and the extended position (FIG. 9).

According to another embodiment, a biasing device 55 can be provided by which the cover device 50 or the cover 51 is prestressed such that the cover device 50 or the cover 51 is pressed or drawn in its closed position. The biasing device 55 can be a spiral spring disposed on an axis of the pivot bearing device 70 an acting between the container or a container wall and the cover device 50 or the cover 51 (FIG. 1*a*).

In the embodiment shown in the figures, the lever arms 85, 86 extend below lower edge 56*b* or the pivotal axis RA, when seen from the upper edge 56*a* of the front plate 50*a*. In an alternative embodiment of the invention, the adjustment lever 84, 85 extends from an intermediate portion, preferably lying at the side edge 54*a*, 55*b* between the upper edge 56 and the lower edge 56*b*.

In the embodiment shown in the figures, the at least one lever arm with the respective guiding portion 84*a*, 85*a* is designed such that the pivotal axis RA is located below the lower edge 56*b*, when seen from the upper edge 56*a* of the front plate 50*a*. In an alternative embodiment of the invention, the at least one lever arm with the respective guiding portion 84*a*, 85*a* is designed such that the pivotal axis RA is located above the lower edge 56*b*, when seen from the upper edge 56*a* of the front plate 50*a*.

In addition a drive device 40 or movement device is provided, which serves for bearing the drawer 30 in the housing 20. The drive device 40 has, moreover, a movement function in addition to the simple bearing function, so that the drawer 30 can be moved between the retracted position and an extended position via a toothed wheel 42, which meshes with a toothed rack 44 fastened to the drawer 30.

If it is now desired to open the drawer 30, the drawer 30 is shifted by means of the drive device 40 from the retracted position, as illustrated in FIG. 1, in the direction of the extended position, as illustrated in FIG. 5. During this shifting process, a coupling takes place of the movement, i.e. the translation, of the drawer 30 between the retracted position and the extended position and the movement of the cover device 50. The cover device 50 is coupled via the articulated connection of the bearing device 70 with the drawer 30. Moreover, a guide device 60 is provided, which has a guide track 81 and a guide portion 84*a*, 85*a*. The guide track 81 is arranged so as to be stationary with respect to the housing 30, whilst the guide portion 84*a*, 85*a*, in the embodiment of the present figures in the form of a roller, is connected with the cover device 50. The roller can therefore move in a rotating manner on the guide track 81, i.e. can be guided along the latter.

Figure 2:
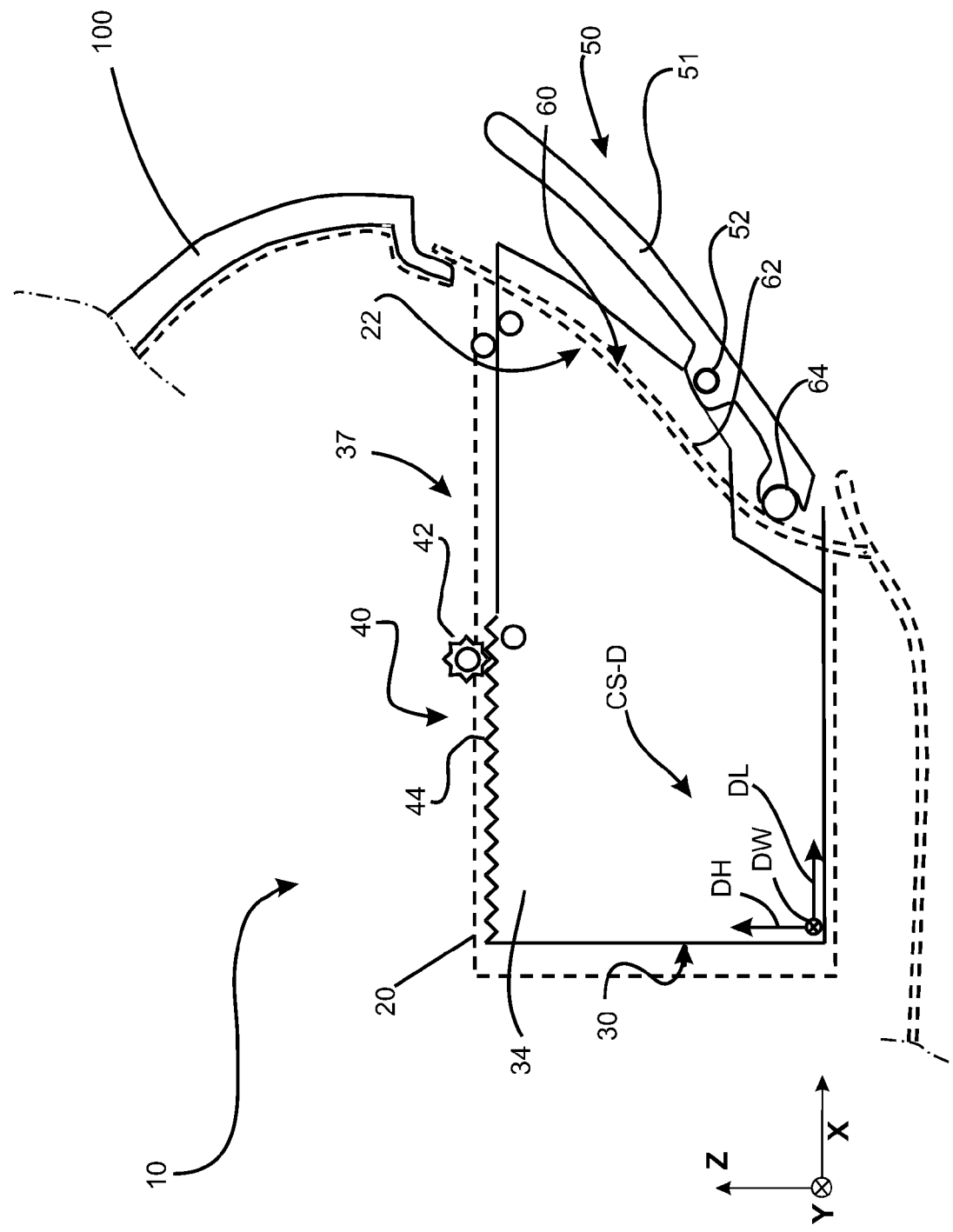
Figure 3:
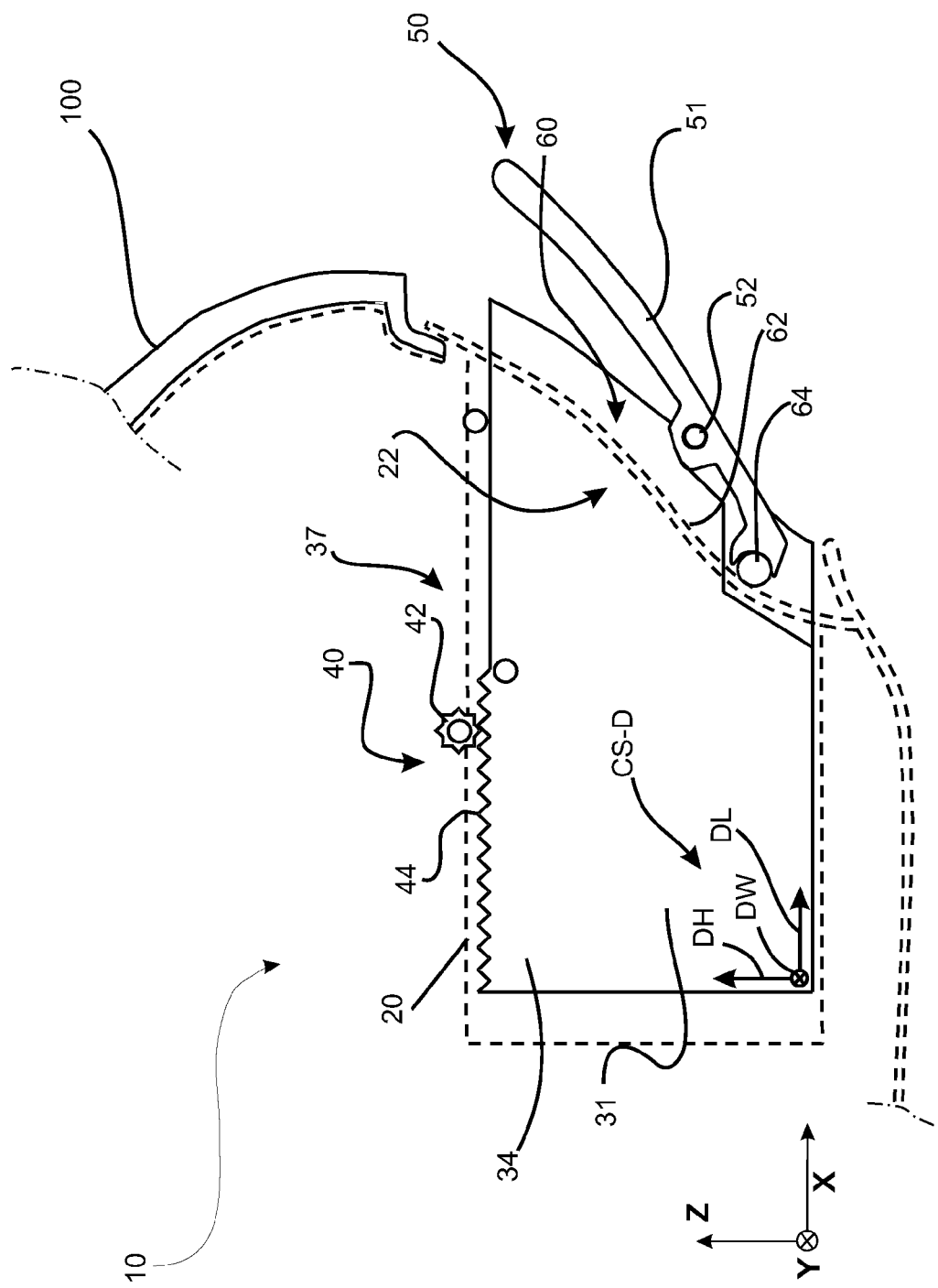

When the drawer is pushed out from the housing 30 through its access opening 22 at the start of the movement, a transition state occurs, as illustrated for example in FIGS. 2 and 3. As can be seen, the drawer 30 moves out form the housing 20 through its access opening 22. During this movement, the guide portion 84*a*, 85*a*, i.e. the roller of the guide device 60, also moves along the guide track 81. Thereby, the support situation of the cover device 50 is altered, so that the latter is pivoted or respectively rotated about the bearing device 70. This takes place in that the centre of gravity of the cover device 50 in the embodiment of the above-mentioned figures lies to the right of the bearing device 70, and therefore works towards an opening of the cover device 50. This opening force works against the guide device 60 in a controlled manner, so that the opening force can be controlled as a weight force via the movement of the guide portion 84*a*, 85*a* along the guide track 81. Over the course of the movement of the drawer 30 in a translatory manner, the guide portion 84*a*, 85*a* will also slide along the guide track 81 and thereby alter the support of the cover device 50. As can be seen in the step between FIG. 2 and FIG. 3, by the progressing opening of the drawer 30 into the extended position, a further pivoting movement of the cover device 50 in the direction of the exposing position takes place.

Figure 4:
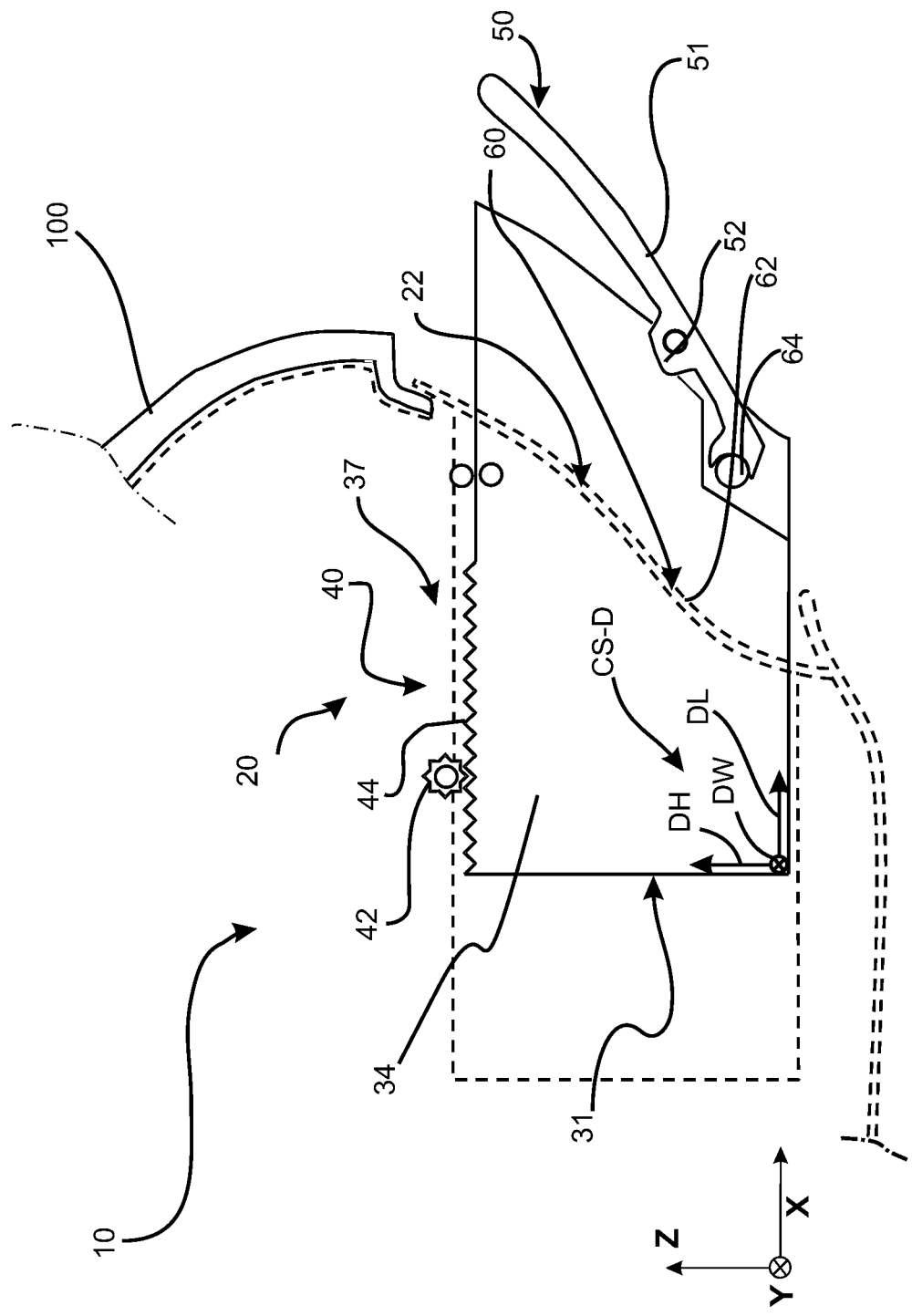

In FIG. 4 a further progress in the extending of the drawer 30 is illustrated. As can be seen here, the guide portion 84*a*, 85*a* has already left the guide track 81. The cover device 50 is therefore situated in the fully exposed position, i.e. in the so-called exposing position. A further extending into the final extended position of the drawer 30, as illustrated in FIG. 5, therefore no longer results in a further moving of the cover device 50. Depending on the explicit embodiment, however, such a leaving of the guide track earlier or later or not at all is envisageable. The coupling between the movement of the cover device 50 and the movement of the drawer 50 can therefore take place basically over a portion, but also over the entire translatory movement range of the drawer 30.

Figure 6:
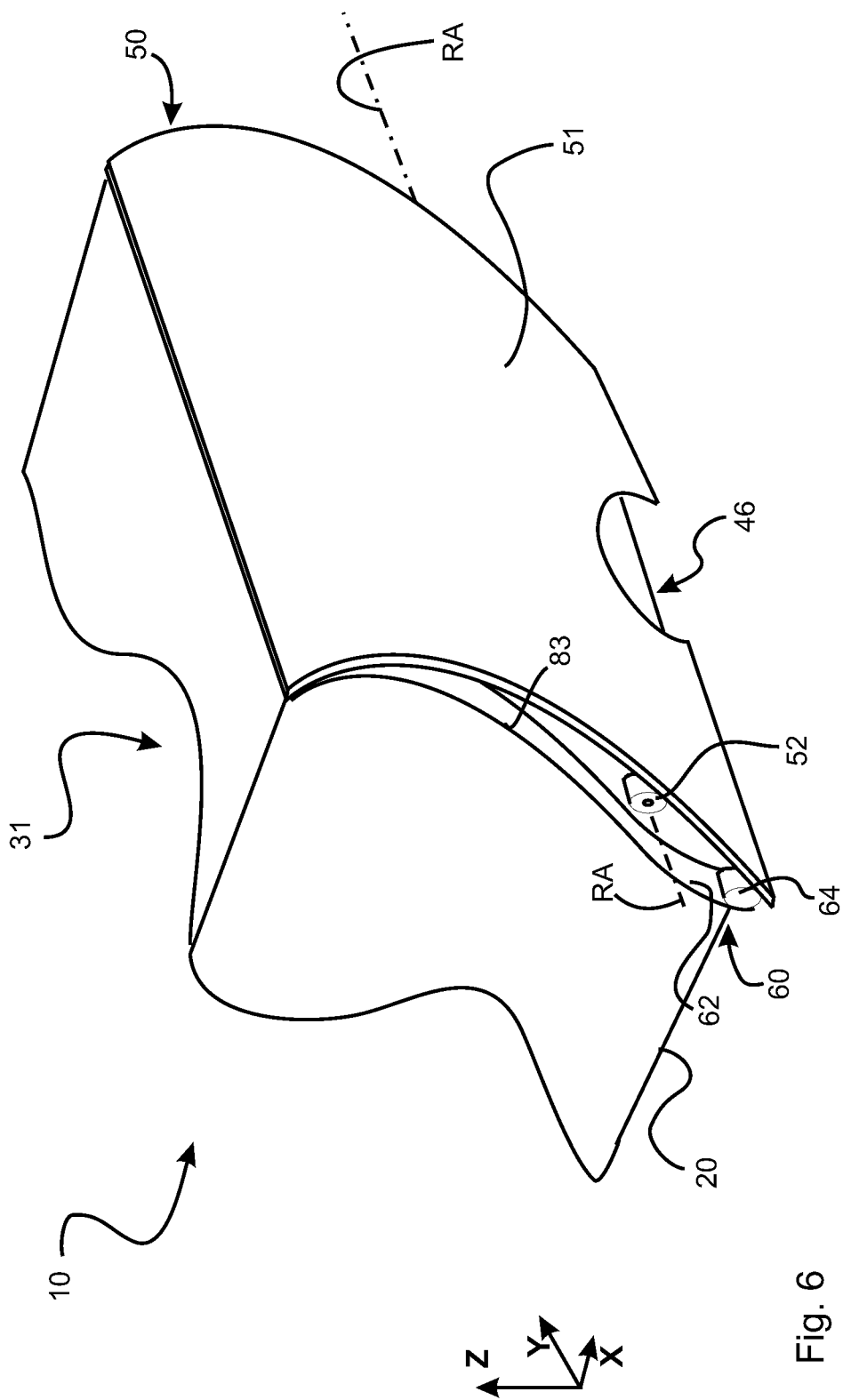

In FIG. 6 a further embodiment of a storage compartment device 10 is illustrated in isometric representation. It can be readily seen here that the cover device 50 already concerns a curved cover which can follow the course of an interior panel part 100 (not illustrated in FIG. 6). The guide device 60 is configured here in several parts and has, in particular, two guide tracks 81 and two guide portion 84*a*, 85*a*, which are arranged on both sides of the cover device 50, wherein only one of the sides, namely the front side, can be seen in FIG. 6. The bearing device 50 is also constructed at two sites, so that two bearing positions with two bearing devices 70 define a pivot axis RA. A mobility of the cover device 50 is possible about this pivot axis RA. This movement, i.e. the pivoting movement, is enabled by the correlation between guide portion and guide track 81.

In the embodiment of FIG. 6 a further component is a grip element 46 on the drawer 30. This is mounted in a recess of the cover device 50 such that the occupant of a vehicle can grip the grip element 46, for example a recessed grip, without impairing the pivoting movement of the cover device 50 during the extending of the drawer 30. For such an embodiment therefore a particularly simple drive device 40 is conceivable, which is provided substantially exclusively for the bearing of the drawer 30.

Figure 7:
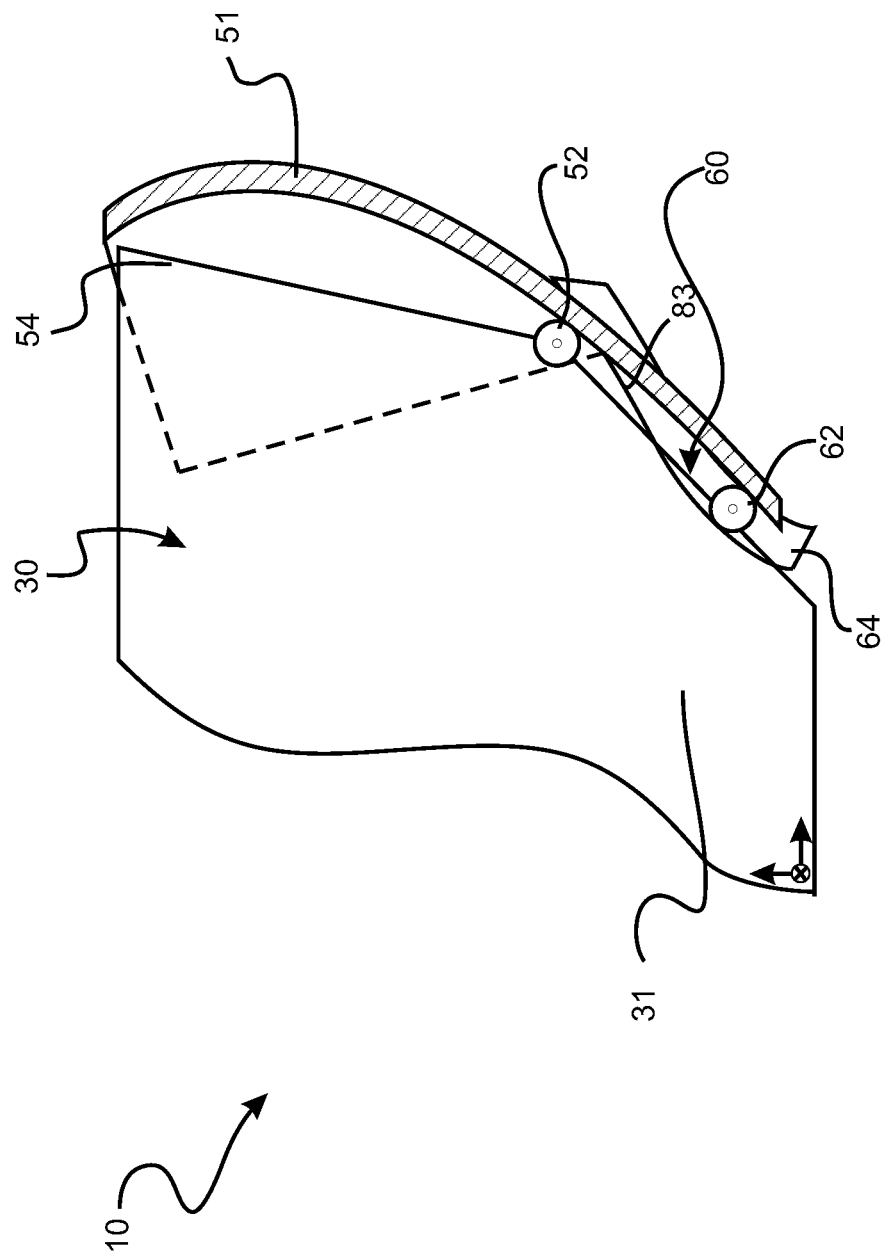
Figure 8:
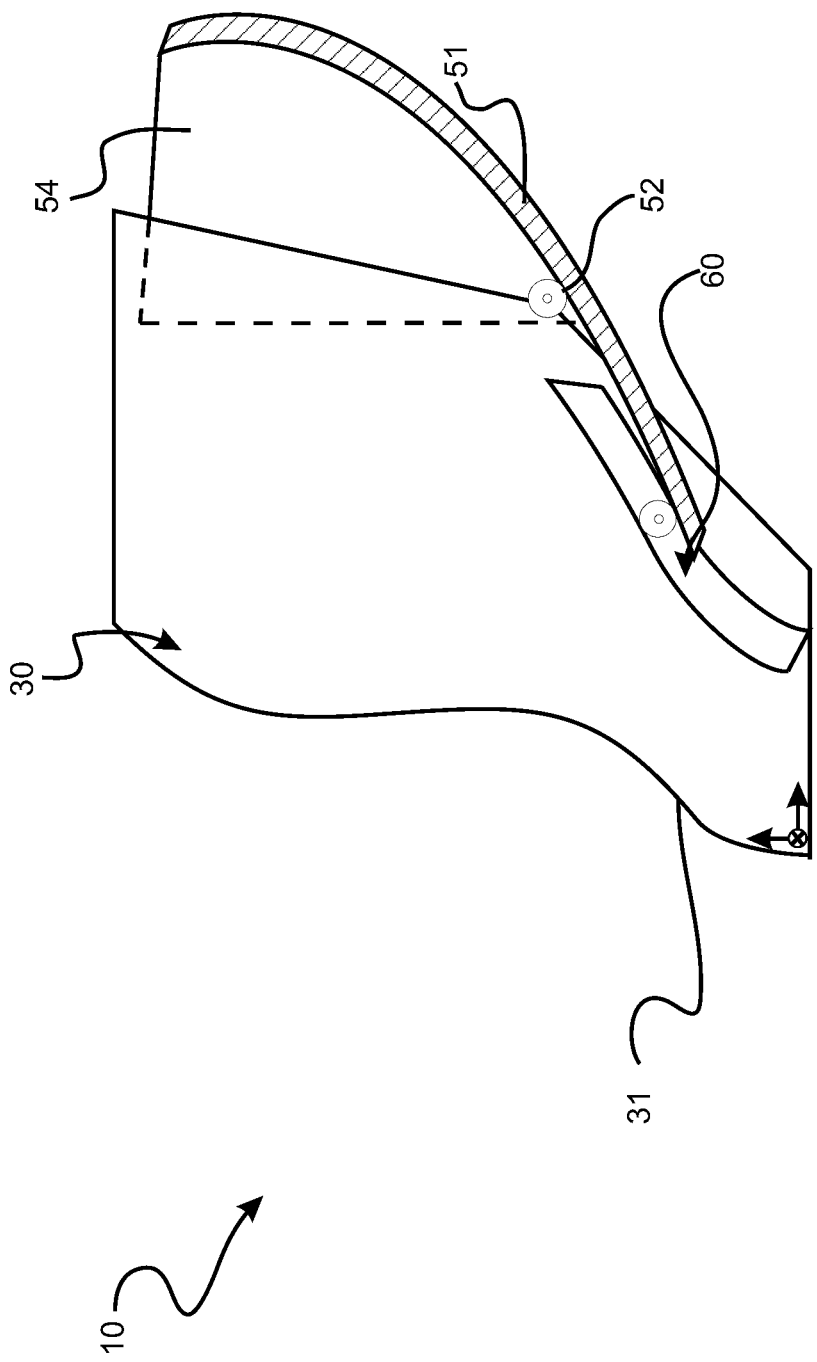

FIGS. 7 to 9 show a further embodiment. In the diagrammatically illustrated embodiment of these figures, a particularly short guide device 60 is present. The guide device 60 has again a guide track 84*a*, 85*a* which, however, is a two-sided guide track, in which the guide portion 81 can move exclusively along the guide track 84*a*, 85*a*. Therefore, a positive guidance of the guide portion 81 takes place and hence of the cover device 50. With such a positive guidance, it is no longer necessary that a weight force of the cover device 50 acts in one direction, i.e. for example in the direction of the exposing position of the cover device 50. Rather, the positive guidance of the cover device 50 can lead both into the exposing position and also into the covering position.

In the embodiment of these figures, moreover the cover device 50 is equipped with side wall elements 54, which in the covering position, as it is illustrated in FIG. 7, at least partially overlap with the side walls 34, 35 of the drawer 30. If now, as illustrated in the following FIGS. 8 and 9, the drawer 30 is extended, then a moving of the cover device 50 takes place via the guide device 60 into the exposing position, as is illustrated in FIG. 9. During this pivoting movement about the bearing device 70, the illustrated side wall element 54 leaves the overlapping with the side wall 34, 35 of the drawer 30 and covers at least a portion of the resulting gap between the cover device 50 and the drawer 30. Of course, it is also possible that the side wall element 54 is configured to be larger, so that almost a complete covering of the resulting gap between the cover device 50 and the drawer 30 is enabled.

The invention claimed is:

1. Drawer for inserting in a frame device with an opening facing the interior of a vehicle such that the drawer in its inserted state is movable between a retracted and an extended state in which the drawer partially extends beyond the opening, wherein the drawer comprises with regard to an occupant in the interior of the vehicle and with the inserted state of the drawer, a front area, a rear area, a top area and a bottom area, the drawer comprising:
   a container, which comprises a base and one or more walls that together at least partially define a container internal space,
   a cover device disposed at a front area of the container for partially defining the container internal space,
   a pivot bearing device pivotally linking the cover device to the container such that the cover device is movable between an opened and a closed position,
   a guiding portion of the cover device, which can be brought in contact with a guide track device of the frame device at a location below a pivot axis of the pivot bearing device, wherein the cover device and the guiding portion are arranged such that the guiding portion is held in contact with the guide track device so that movement of the drawer between its retracted and extended states is coupled to movement of the cover device between its opened and closed positions.

2. Drawer according to claim 1, wherein the cover device comprises a front plate and side plates, wherein each of said side plates extends from a side edge of the front plate and is aligned with an adjacent side wall of the container such that the side plates overlap the respective side wall of the container.

3. Drawer according to claim 1, wherein the cover device is positioned at the container such that with a corresponding shape of the guide track device the cover device tends to move to its open position due to a rotational momentum which is generated by a force due to gravity during movement of the drawer between the refracted and the extended states so that the guiding portion is pressed against the guide track device.

4. Drawer according to claim 1, wherein the guiding portion is adapted to engage around a guide track of the guide track device so that the guiding portion is in contact with the guide track within the movement of the drawer between the retracted and the extended states.

5. Drawer according to claim 1, wherein a guide track of the guide track device in form of a guidance groove is adapted to engage around the guiding portion so that the guiding portion is in contact with the guide track within the movement of the drawer between the retracted and the extended states.

6. Drawer according to claim 1, wherein the container comprises a connection device for transmission of a driving movement generated by a drive device in order to move the container between its extended and retracted states.

7. Drawer according to claim 1, wherein the cover device is prestressed by a biasing device by which the cover device is pressed or drawn in its closed position.

* * * * *